Sept. 17, 1968  W. H. BOWEN ET AL  3,401,718

SAFETY VALVE HAVING PARALLEL FLOW BLEED OUTLETS

Filed June 22, 1965  2 Sheets-Sheet 1

INVENTORS
HOMER E. FERRILL &
WILLIAM H. BOWEN
BY
*James E. Anderson*
ATTORNEY

Sept. 17, 1968     W. H. BOWEN ET AL     3,401,718
SAFETY VALVE HAVING PARALLEL FLOW BLEED OUTLETS
Filed June 22, 1965     2 Sheets-Sheet 2

INVENTORS
HOMER E. FERRILL &
WILLIAM H. BOWEN
BY
ATTORNEY

United States Patent Office 3,401,718
Patented Sept. 17, 1968

3,401,718
SAFETY VALVE HAVING PARALLEL FLOW
BLEED OUTLETS
William H. Bowen and Homer E. Ferrill, Alexandria, La., assignors to Dresser Industries, Inc., Dallas, Tex., a corporation of Delaware
Filed June 22, 1965, Ser. No. 465,842
5 Claims. (Cl. 137—470)

ABSTRACT OF THE DISCLOSURE

A safety valve for relief of system overpressure. The valve includes an adjustable blowdown control by means of a backpressure chamber above the lift disc having adjustably and responsively variable but continuous controlled venting from between full lift to valve closed positions.

---

This invention relates to safety valves and more particularly to a novel and improved spring loaded safety valve particularly adapted for use on steam service.

In the design of spring loaded safety valves it is desirable to provide means for assurance that the valve will open rapidly and fully in response to an increase in pressure, to a predetermined value or "set pressure," of the fluid acting on one side of the reciprocable valve member or disc. The set pressure is adjusted by preloading of the coil spring acting on the other side of the valve disc. The amount of preloading of the spring necessary to obtain a desired set pressure is dependent on the rate of the spring used. In spring loaded safety valves it is usual that the disc will not be fully seated until the fluid pressure has gone somewhat below the set pressure at which the valve begins to open. The difference between set pressure and the pressure at which the valve is again closed is referred to as "blowdown" and is measured as a percentage of set pressure. It will be apparent that during the blowdown fluid will escape through the valve even though the valve inlet pressure is below set pressure. Thus, the fluid passed by the valve during blowdown detracts from the efficiency and economy of the over-all system protected by the valve.

In the conventional high capacity safety valve, when the set pressure is reached in the inlet of the valve under the disc, the disc will open slightly to permit the escape of fluid and the escaping fluid will then engage additional surface area on or movable with the disc, and be redirected, in order to obtain rapid opening of the disc, or "popping," and to tend to cause the disc to rise toward "full lift" in order to obtain the maximum flow capacity for the valve. Full lift is the spacing of the disc from its seat which will provide an effective flow area between the disc and seat which is at least equal to the effective flow area of the valve inlet below the seat. Thus, when a disc is at full lift, the controlling orifice is the valve inlet or nozzle, and it is just as if the disc were not present as far as the valve's ability to pass steam is concerned. It will thus be apparent that if the disc does not lift to full lift the full capacity of the valve is not realized. In prior "high capacity" valves, full lift is not obtained at set pressure when the valve pops or at any other time during normal operation of the valve. This is due to the fact that the means used for assuring popping action, acts in opposition to the desire also to provide a short blowdown for the valve. Accordingly, pertinent codes recognize this problem and to attempt to assure safe operation require that safety valves go to full lift at three percent (3%) overpressure above set pressure. It has been found that valves alleged to perform in this manner have fallen far short of the requirement. Inasmuch as testing for full lift requires overpressure in the associated pressure vessels, which is not recommended, such tests are not often employed, particularly in connection with high pressure valves. Thus, in most cases proof of full lift is obtained by extrapolation from tests of lower pressure valves.

It will thus be seen that in prior high capacity, high pressure valves the best performance that could be obtained was a compromise between optimum lift and capacity and optimum blowdown. More specifically, approximately a 4–5% blowdown was the best obtainable for a high capacity, high pressure valve.

Many attempts have been made to reduce the blowdown of spring loaded safety valves. One well known method is represented in what is referred to as a spindle overlap valve such as the valve shown in United States Patents Nos. 1,949,150 and 2,151,501. In valves such as shown in these patents, the spring biased spindle which acts on the valve disc has a portion which cooperates with a vent opening in a wall, forming a part of a chamber behind the valve disc, so as to close said opening when the disc is seated and to provide a flow path from said chamber when the disc is raised. More particularly, the spindle or means on the spindle, is stepped or grooved so that when the disc is seated the portion of the spindle within said opening is substantially the same diameter as, and serves to prevent any siginificant flow or pressure drop through said opening. When the valvet inlet pressure reaches the set pressure, the valve disc is moved rapidly to its open position. Due to clearance between the disc and its guiding structure, some of the escaping fluid passes into the chamber behind the disc. Due to the rapid opening of the disc, there is insufficient time for the pressure to build up within the chamber, and by the time such time has elapsed, the disc is open and the stepped or grooved portion of the spindle is in registry with said opening to permit the flow of fluid from said chamber thus preventing any significant buildup of back pressure on the disc. The valve is manufactured so that the vent opening will be closed as soon as the disc again moves toward its seat so as to bring the larger diameter, or ungrooved portion, into registry with said opening whereby a substantial back pressure is built up behind the disc, which assists the spring in closing the disc, thus contributing to a shorter blowdown. While such valves have proved useful for low pressure, low capacity installations they have not been used for high pressure due to a tendency to cause severe damage to the disc and seat at higher pressures.

Other prior methods of attempting to reduce blowdown have been the use of adjustable bleed orifices for back pressure chambers such as shown in United States Patents Nos. 1,690,097 and 2,754,842. Such methods however do provide for any control of back pressure in response to disc position, as does a spindle overlap valve, and thus, there is always a substantial back pressure on the disc. If the pressure is adjusted to be sufficient to materially improve blowdown, it would prevent the disc from rising sufficiently to provide a full lift, high capacity. On the other hand if the back pressure were reduced to improve capacity and lift, then blowdown would be undesirably increased.

Also, there have been spring loaded safety valves provided, as in the valve of United States Patents Nos. 2,672,882 and 2,597,057, with one adjustable orifice for a back pressure chamber which was always open and a second orifice for the chamber which was closed when the disc was raised and was opened only as the disc neared its seat. Thus, there have been many prior attempts to reduce the blowdown of a safety valve and also to provide high capacity, valves but heretofore the improvement of one aspect has not been achieved together with one improvement of the other aspect.

Another problem present in spring loaded safety valves is concerned with the fact that the coil springs used, while being designed and manufactured to have a certain spring rate, vary in spring rate from spring to spring. While the usual commercial spring rate tolerance is about ±10%, the springs for safety valves have a spring rate tolerance of ±5%. To provide safety valve springs to a substantially lesser tolerance is not economically feasible. If a spring at the high end of the tolerance range is used in a conventional valve, the actual spring force on the disc when the disc is at maximum lift will be 5% greater than if a spring of the actual design spring rate were used. Accordingly, the disc will normally not lift to the extent desired, or if it should because of overpressure, the disc will begin to close sooner, or in other words, at a higher pressure than is desired. Conversely, if the spring is at the low end of the tolerance range, the disc will lift farther than desired and/or the disc will close later, or at a lower pressure, than is desired, thus providing the valve with an undesirably long blowdown. Corrections for these effects by varying the preloading of the spring is not possible as this will vary the set presure at which the valve will open.

It is the primary object of this invention to provide a novel and improved safety valve which will have higher capacity and a shorter blowdown.

It is further an object of this invention to provide a novel and improved safety valve which will reliably go to full lift at set pressure.

It is another object of this invention to provide a safety valve having novel and improved means for selectively adjusting the blowdown of the valve.

It is still another object of this invention to provide a safety valve which will go to full lift at set pressure and which has means for adjusting the blowdown of the valve within a range heretofore not achieved while at the same time maintaining full lift at set pressure.

It is yet another object of this invention to provide a novel and improved spindle overlap safety valve having means for independently adjusting lift, blowdown and the slope of the blowdown curve after closing of the overlap, all from externally of the valve while the valve is on a pressure vessel.

It is further an object of this invention to provide a novel and improved spring loaded safety valve having means for readily compensating for spring rate tolerance while not adversely affecting, but rather improving the overall performance of the valve.

Production of an improved safety valve having the foregoing advantages accordingly becomes the primary object of this invention, with other objects thereof becoming more apparent upon a reading of the following brief specification, considered and interpreted in the light of the accompanying drawings.

Figure 1:
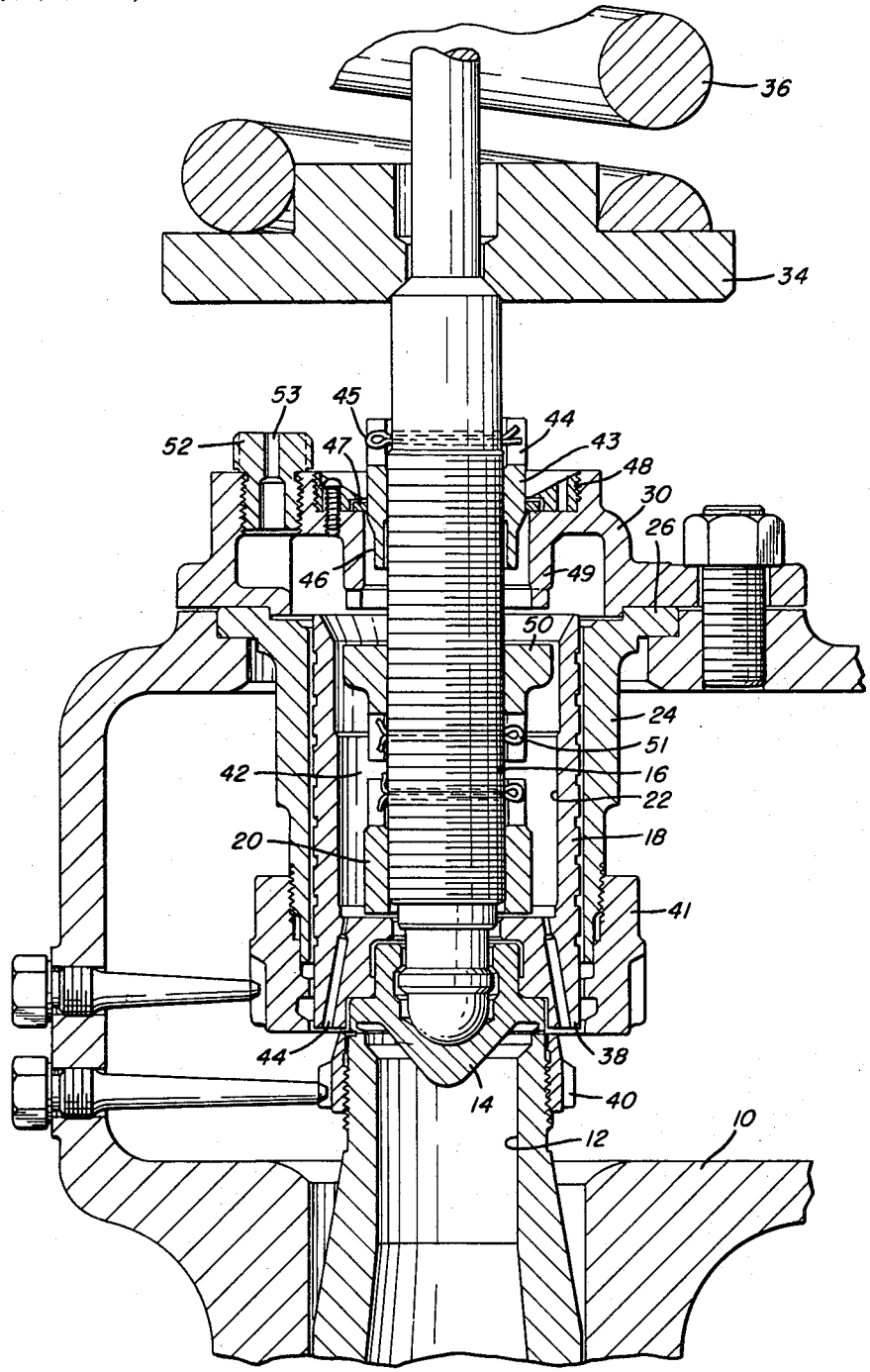
FIGURE 1 is a fragmentary, cross-sectional, elevational view of a safety valve incorporating the present invention.

With reference to FIGURE 1 of the drawings, a spring loaded safety valve of a type with which this invention is concerned comprises a valve body 10 having an inlet portion in which is received a nozzle 12. The upper end of the nozzle provides a seat for the valve disc 14 which serves to close the valve inlet. The disc 14 is carried by a stem or spindle 16 extending generally coaxially of the nozzle 12. A disc holder 18 is also mounted coaxially of and for movement with the spindle 16, being held in engagement with the disc by a nut 20 threadably engaged over the spindle. The disc holder 18 includes an upwardly projecting cylindrical skirt 22 the outer surface of which is a continuation of the outer surface of the contiguous lower portion of the disc holder. The disc holder is telescopically received within and guided by a sleeve 24 disposed coaxially of the valve seat and depending from an annular flange 26 supported on the valve body as at 28. The flange 26 is maintained in assembly with the body 10 by a cover plate or bonnet 30 which in turn is suitably secured to the body such as by bolts.

The spindle 16 extends upwardly through the bonnet 30 and is provided with a generally upwardly facing, circumferentially extending shoulder on which rests a washer 34. A compression coil spring 36 is disposed coaxially over the spindle 16 with the lower end of the spring resting on the washer 34. Suitable conventional means, not shown, are provided for selectively axially preloading the spring 36 so that the disc 14 will move upwardly away from its seat in opposition to the spring in response to the presence of a predetermined fluid pressure in the nozzle 12 underneath the disc. When the disc is initially spaced from its seat, steam flowing between the disc and seat will impinge upon the lower end surface of the disc holder 18, as at 38, thus materially increasing the area on which the steam pressure may act. This will result in a substantial increase in the upward force on the disc with an attendant rapid opening, or "popping" of the valve.

The popping of the valve is further enhanced in a known manner by an upper adjusting ring 41, which is threadably engaged over the lower end of the fixed sleeve 24. The upper ring 41, in a known manner, redirects the steam, and this redirection of the steam provides additional force on the disc holder which, particularly in the upper portion of the disc travel, assists in obtaining full lift of the disc. By adjusting the upper ring to move it toward the seat, a greater force will be exerted on the disc and disc holder by the redirected steam, thus tending to obtain a higher lift so the opposite result is achieved by raising the upper ring. A lower adjusting ring 40 is also provided. The lower ring 40 is threadably mounted over the upper end of the nozzle for movement toward and away from the underside of the disc. The lower ring is used to adjust the initial movement of the disc away from the seat, to eliminate simmer and to provide a cushioning effect on the disc in its final movement into engagement with the seat. Adjustment of both the upper and lower rings is possible from externally of the valve after the valve has been assembled. The operation of the valve as thus far described is well known and, as is also well known, other structures may be used to achieve the desired popping and aid redirection of steam flow to assist in moving the disc upwardly.

In a valve of the type shown in FIGURE 1, the bonnet 30, sleeve or disc guide 24 and disc holder 18 cooperate to provide a back pressure chamber 42 behind or above the valve disc, whereby any pressure in this chamber will tend to move the disc toward its seat, or in other words exert a force on the disc in the same direction as the force exerted by the spring 36. Steam exhausting from the nozzle 12 may pass into the chamber 42 both through passages 44 extending from the lower end 38 of the disc holder to the chamber 42 and through the clearance space between the slidably engageable surfaces of the disc holder 18 and disc guide 24.

A novel spindle overlap arrangement provides a vent for the chamber 42 when the disc is in its full open position. More particularly, the spindle 16 is provided intermediate its ends with an enlarged portion formed by a sleeve 43 coaxially arranged over the spindle and threadably engaged therewith for adjustment axially of the spindle. The sleeve 43 has a plurality of slots 44 extending radially thereof and spaced angularly about the sleeve axis. A cotter pin 45 received in a diametrically extending opening in the spindle is also received in a selected pair of slots 44 in the sleeve 43 to lock the sleeve in selected adjusted position axially of the spindle. The sleeve 43 has a reduced diameter portion 46 at its lower end, the outer surface of which gradually merges with the outer surface of the upper larger diameter portion of the sleeve to provide a tapered portion between the upper and lower surfaces. The sleeve 43 is slidably received in a floating washer 47 which is supported on an upwardly facing shoulder or surface on the bonnet 30. The washer is retained on the bonnet by a retaining ring 48 which is threadably mounted on the bonnet for movement generally coaxially of the valve seat. The retaining ring has a cylindrical wall extending about the washer 47 and generally coaxially of the valve seat and a radially inwardly extending lip overlying the washer. This wall has a diameter which is at least slightly greater than the outer diameter of the washer 47 and the lip is spaced slightly above the washer, whereby the washer is permitted some lateral or floating movement to prevent binding of the sleeve 43.

When the disc is seated the lower end of the larger diameter portion of the sleeve 43 is located substantially below the washer 47 so that there is no significant flow passage provided outwardly of the chamber 42 between the spindle and bonnet. As the disc rises on popping of the valve, there will be no great rise in pressure in the chamber 42 as the disc will rise sufficiently rapidly that there will be insufficient time for any significant flow of steam into the chamber 42 to occur before the disc reaches its uppermost position. The uppermost position of the disc it determined by mechanical stop means provided in part by a cylindrical projection 49 depending from the bonnet 30 and disposed generally coaxially of and radially outwardly of the spindle. The lower end of the projection or fixed stop 49 is engageable with an adjustable stop 50 in the form of a sleeve-like member threadably engaged over the spindle for adjustment axially thereof. The stop 50 has at its lower end a plurality of pair of radial slots similar to the slots 44 in the sleeve 43. A cotter pin 51 extending diametrically through the spindle is engaged in a selected pair of these slots to lock the stop 50 in adjusted position. The stop 50 is adjusted so that when it is in engagement with the fixed stop 49, the disc will be at a lift which is at least equal to one fourth the diameter of the primary orifice of the valve formed by the upper end portion of the nozzle, or in other words the disc is at "full lift" whereby the flow capacity of the valve is limited only by the dimensions of the primary orifice.

As the disc rises, the attendant rising of the spindle will result in the lower end of the larger diameter portion of the sleeve 43 rising above the washer 47 thus providing a vent for the chamber 42 of sufficient effective flow area that the back pressure in the chamber 42 will be maintained at a level sufficiently small to prevent premature closing of the valve. In the embodiment of FIGURE 1, the back pressure in the chamber 42, when the disc is at full lift, is essentially determined by the difference in diameters of the washer 47 and reduced diameter portion 46 of the overlap sleeve 43. However, when the overlap sleeve has lowered sufficiently to move the tapered intermediate surface of the sleeve into the washer 47, there will be a substantially instantaneous rise in pressure in the chamber 42 to effect a rapid seating of the disc. In accordance with the invention when the overlap sleeve 43 has closed the vent through the washer 47, the chamber 42 will not be substantially sealed. More particularly to prevent complete sealing there is provided an orifice plug 52 threadably inserted in an opening in the top wall of the bonnet 30. The plug has a small diameter bleed passage 53 in communication at its inner end with the chamber 42 and at its outer end exhausting to atmosphere. In the embodiment of FIGURE 1, the effective flow area of the passage 53 is quite small with respect to the flow area provided by the overlap sleeve 43 at full lift of the disc. However, when the overlap sleeve has closed, the passage 53 provides a sufficient venting of the chamber 42 that the rise in pressure in the chamber due to closing of the overlap will not be of sufficient duration or value to cause the disc and/or seat to be damaged by the otherwise too rapid and forceful closing of the disc. For example, in a valve incorporating the invention, a back pressure of about 100 pounds per square inch was measured when the valve was at full lift. As the overlap sleeve began to close, the pressure rise was so rapid and of so short duration that the gauge measuring the back pressure could not respond quickly enough to give a reading before the disc closed. With the disc closed the back pressure was measured at about 50 pounds per square inch and this pressure decayed rapidly to zero. Thus it can be seen that in accordance with the aspect of the invention as represented by the embodiment of FIGURE 1, the area of the constantly open or fixed vent or bleed passage 53 should be sufficiently small with respect to the flow area provided by the overlap that the closing of the overlap will provide a sufficient rapid rise in pressure to effect rapid closing of the valve but that the size of the passage 53 should be sufficiently large to prevent damage to the valve when the overlap is closed. The passage 53 is preferably upwardly so that escaping steam will impinge on the underside of the washer 34 and will not be a danger to adjacent personnel.

Figure 2:
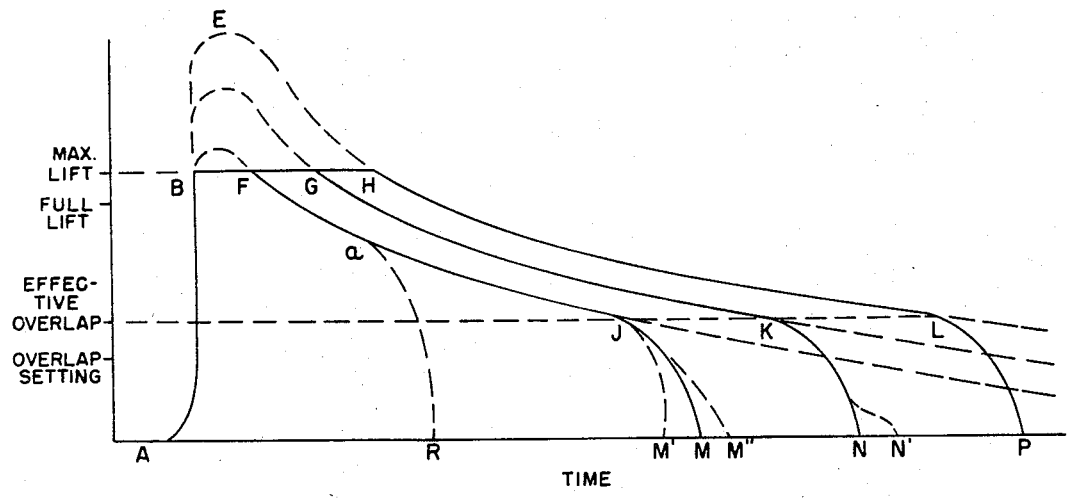
FIGURE 2 is an exemplary graph illustrating the performance of the valve of this invention.

The advantages of the valve of FIGURE 1 will be apparent from a consideration of its performance as represented by the graph of FIGURE 2. In FIGURE 2 the vertical axis represents lift of the disc and the horizontal axis represents time. In adjusting the valve of FIGURE 1, all adjustments may be made while the valve is on the pressure vessel, although an initial setting of the upper and lower rings are made before the valve is installed. Also an initial adjustment of the preloading of the spring 36 and of the overlap bushing 43 may also be made before installation of the valve. After the valve is installed on a pressure vessel, the preloading of the spring 36 is adjusted to provide popping of the valve at the desired set pressure. The spring 36 is of substantially lower spring rate than a spring for a conventional high capacity valve. This would normally result in a valve having such a long blowdown as to be impractical. However, by adjusting the overlap timing in the valve of this invention, full lift at set pressure may be obtained with a very low blowdown.

Referring to FIGURE 2, when set pressure is reached the disc will lift along the line A–B. The initial slope of the curve is determined by the setting of the lower adjusting ring. Movement of the lower ring closer to disc will result in a sharper initial opening and will eliminate any simmer. The disc will be limited in lift by the stops 49 and 50. The stop 50 is adjusted to provide a maximum lift which is substantially greater than full lift for the valve so as to assure that the disc will achieve full lift. For example, a valve having a full lift dimension of .450″ might have the lift stops set to provide a maximum lift of .480″ to .500″. It will be understood that in a valve of this invention, the disc is at maximum lift at point B on the curve of FIGURE 2.

The disc will remain at maximum lift until the pressure acting on the bottom of the disc and disc holder has reduced sufficiently that the disc will begin to move downward under the influence of the spring 36 and pressure in the back pressure chamber 42. For example, the disc might remain at maximum lift for a time indicated by the line B–F–G–H and then lower along the line H–L. At point L, the disc will have lowered sufficiently that the upper end of the reduced diameter portion of the overlap bushing 43 will enter the washer 47, whereupon the disc will rapidly close along the line L–P. The curve A through P might, for example, represent a blowdown of 3½ percent.

It will be observed that the back pressure chamber does not come into full effect until the disc has moved a substantial distance from the upper limit stop. For example, with a disc having a full lift dimension of .450″, the bushing 43 might be adjusted to a nominal setting of .100", or in other words the overlap will be fully closed when the disc is at a lift of .100". However, the effective overlap dimension will be somewhat greater, for example .276", due to the fact that the lower end of the tapered intermediate surface of the bushing will enter the washer 47 to throttle this vent at a higher lift position of the disc than will the lower end of the larger diameter upper end of the bushing. It will be apparent that the difference between the nominal overlap setting and the effective overlap setting will be determined largely by the angle of the taper of the intermediate surface. It is preferred that this taper be sufficient to avoid hang up of the bushing 43 on the washer 47. It will further be apparent that if the tapered intermediate surface were omitted, the nominal and effective overlap setting would be the same.

For a given set pressure and spring rate the time that the disc remains at maximum lift will be determined by the setting of the upper ring. For example, with the ring set "low" the force on the disc will be "high" and a greater pressure drop under the disc will be necessary before the disc starts to drop. This is represented in FIGURE 2 by the line B–E–H which is the curve of lift versus time of the disc if the limit stops were not present. If it is desired to reduce this time and reduce blowdown, the upper ring may be raised to cause the disc to remain at maximum lift only along the line B–F–G. If the overlap timing is not changed the disc will close along the curve G–K–N. If a still lower blowdown is desired, the ring may be raised further to cause the disc to remain at maximum lift only the time and pressure drop represented at B–F and then to close along the line F–J–M. Thus, a change in setting of the upper ring will effect a change in blowdown without affecting the maximum lift of the valve and without affecting the overlap timing. If it is desired to reduce the blowdown even further the overlap bushing may be lowered to raise the effective overlap setting to obtain an earlier overlap closing as indicated at Q–R. In a valve of this invention blowdown may be set as low as 0.1 percent. For example, in a specific embodiment of a valve of this invention set at 2,150 pounds per square inch the upper ring was raised sufficiently so that disc went to maximum lift at set pressure but just barely so. The overlap bushing was lowered to obtain an effective overlap closing shortly after the disc moved out of maximum lift. The pressure at disc closing was about 2,147 or in other words, a blowdown of 3 pounds per square inch or about 0.1 percent was achieved.

Further variation of blowdown may be effected by varying the size of the constantly open bleed passage 53. If a plug 52 having a smaller passage 53 is used the disc will close, for example, along the line J–M', and if a larger passage 53 is used, the disc will close such as along the line J–M". While the closing of the disc, subsequent to closing of the overlap, will be substantially instantaneous, it is believed that variation in the size of the passage 53 will vary the slope of the final closing curve as it has been observed that a variation in the size of the passage 53 will bring about a measurable change in blowdown. It has also been observed that the varying of the area of the passage 53 will bring about an audibly apparent difference in the force, and thus the speed, with which the disc seats.

A final adjustment permitted with the valve of this invention is the adjustment of the lower ring 40 to cushion the final closing of the disc. For example, a raising of the lower ring will cause the disc to move as along the line K–N'. Thus, it will be seen that with a valve of this invention, full lift is achieved at set pressure and the valve cycle may be adjusted as desired and in particular blowdown may be adjusted from essentially zero to any practical value. The adjustment of the upper ring may be made without affecting blowdown as in prior valves, as any increase in blowdown, may if desired be compensated for by adjustment of the overlap timing and/or area of the bleed passage 53. Thus, if desired, the upper ring may be adjusted to compensate for variations in spring from nominal, and any adverse effect on blowdown may be removed by adjusting the overlap timing. It will be particularly noted that all of the adjustments on the valve are made from externally of the valve while the valve is assembled and installed on the pressure vessel.

The valve of FIGURE 1 has been described as having a bleed passage 53 which is small as compared to the vent provided when the overlap is fully open. Thus, a small change in the area of the passage 53 will not effect a large change in pressure in the chamber 42 when the overlap is fully open. However, if the ratio of overlap vent area to the area of the passage 53 is substantially reduced a variation in the size of the passage 53 will more greatly affect the pressure in the chamber 42 when the disc is at maximum lift. In such a modification of the valve, the variation in backpressure at maximum lift brought about by changes in the size of the passage 53 may be used to correct for spring rate tolerance. In other words if the spring is too light a plug with a smaller passage 53 may be used, and if the spring is too heavy a plug with a larger bleed passage may be used. The number of sizes of bleed passages 53 for a given valve and coil spring tolerance range should be sufficient to provide the desired control of the bleed passage size or in other words provide means for selectively controlling or varying the size of the constantly open bleed passage 53. The actual size of bleed passage which is best for a given spring rate may be determined empirically. It is contemplated that a practical number of bleed plugs may be provided each of which will cover a small spring rate variance. Even if the bleed orifice 53 is small as regards the overlap vent so that the orifice 53 does not control the back pressure in the valve, it is desirable to be able to vary the area of the orifice 53 in order to compensate for tolerances in the "inlet" to the chamber 42 and thus maintain the ratio of outlet to inlet areas of the chamber in the desired range.

Figures 3, 4:
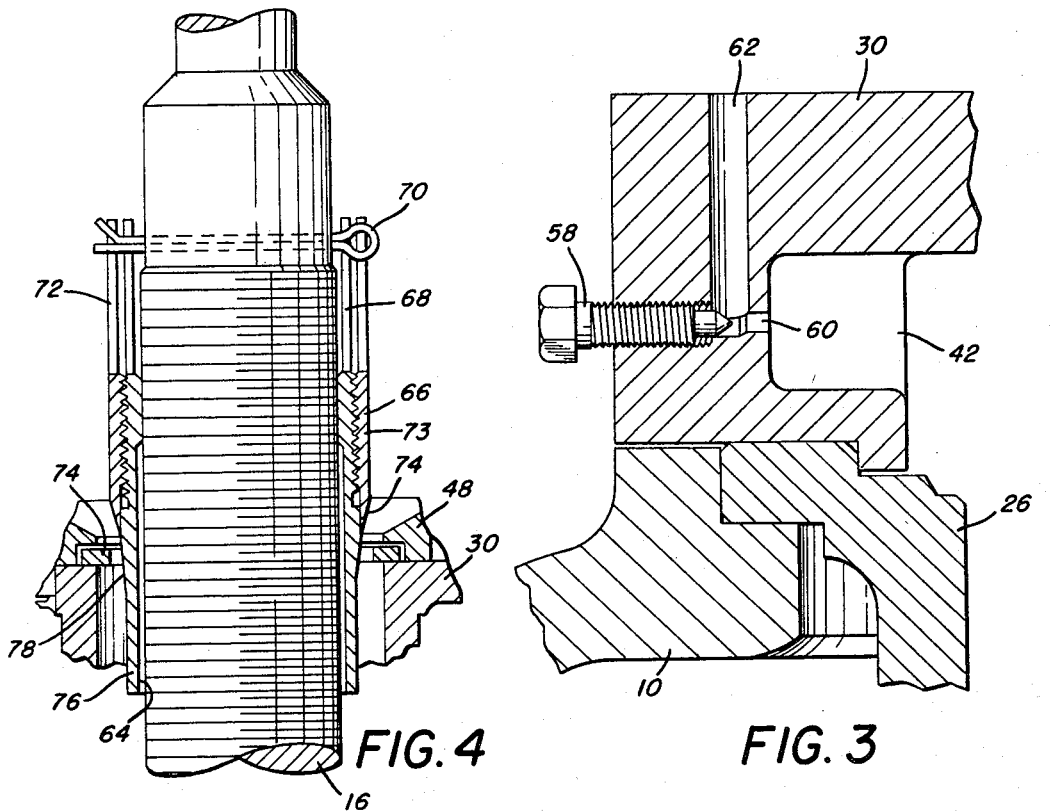
FIGURE 3 is a fragmentary view partly in section of a modification of a portion of the valve of FIGURE 1.
FIGURE 4 is a fragmentary sectional view of a further modification of the valve of FIGURE 1.

If closer control of the size of the constantly open bleed passage is desired, a modification such as shown in FIGURE 3 may be used. In this alternative construction a needle valve 58 is threadably received in the side wall of the bonnet 40 and is effective to control the pressure drop across the passage 60 which communicates at its inner end with the back pressure chamber 42. More particularly, inward or outward threading of the valve 58 will vary the restriction in the flow from the passage 60 to the outlet passage 62 in the bonnet and leading to atmosphere. Thus, an infinite adjustment of the flow through the passage 60 is provided. It will be noted that it is not possible to thread the valve inwardly sufficiently to close the passage 60. More specifically, the valve 58 has a predetermined minimum effective flow area to assure that there will be complete venting of the chamber 42 when the disc is closed and to assure that on closing of the overlap during closing of the disc, the pressure in the chamber 42 will not be such as to cause too forceful a seating of the disc thus avoiding disc and seat damage or destruction.

Another alternative construction for varying the backpressure when the disc is open, and thus varying the net force on the disc tending to maintain it open, is shown in FIGURE 4. Rather than a single overlap sleeve 46 as in the embodiment of FIGURE 1, this embodiment utilizes a pair of telescopically arranged sleeves or bushings 64 and 66. The inner sleeve 64 is threadably mounted coaxially over the stem 16 and has slots, as at 68, at its upper end cooperating with a cotter pin 70 in the same manner as the slots and pin associated with the overlap bushing 43 previously described. The outer sleeve 66 is threadably and coaxially mounted over the sleeve 64 and also has slots 72 at its upper end cooperating with the cotter pin 70. The outer sleeve 66 has an outer cylindrical surface 73 which slidably fits within the opening in the floating washer 47. The lower end of the sleeve 66 is slidably supported on a cylindrical surface on the sleeve 64. The lower end of the sleeve 66 is carried by reason of an external taper, as at 74, which prevents hang up of the outer sleeve on the washer. The sleeve 64 has a cylindrical outer surface 76 at its lower end which has a diameter substantially less than the inner diameter of the sleeve 66. The surface 76 terminates at its upper end in a frusto-conical surface 78 which flares upwardly and outwardly to a diameter substantially equal to the inner diameter of the outer sleeve 66.

With the disc closed the sleeves 64 and 66 will be received within the washer 47 with the surface 73 of the outer sleeve effectively closing the overlap vent. When the disc is at maximum lift, as in FIGURE 4, the sleeve 66 will be spaced above the washer and the limitation of flow through the overlap will be governed by the difference between the inner diameter of the washer and the minimum diameter of the registering portion of the frusto-conical surface 78 on the sleeve 64. By adjusting the inner sleeve 64 axially of the stem and relative to the outer sleeve 66, the effective flow area of the overlap vent may be changed without varying the timing of the overlap. On the other hand, by adjusting the outer sleeve axially relative to the inner sleeve and stem the timing of the overlap may be varied independently of any adjustment of the back-pressure when the disc is opened. It will be apparent that the back pressure in the chamber 42 will be dependent on the ratio of the area of the total "outlet" of the chamber 42 to the total "inlet" area. In a valve of this invention, this ratio should be on the order of from 5:1 to 12:1. Accordingly, the taper on the surface 78 of the inner sleeve 64 preferably will provide adjustment of this ratio over this range.

While the invention has been described in terms of specific embodiments, it will be apparent that many changes, alterations and different arrangements of parts may be provided while not departing from the scope of the invention. For example, rather than providing a separate orifice plug to provide constant venting of the back pressure chamber, slots might be cut axially of the bushing 43 so that when the overlap was closed there would still be a substantial venting of the chamber 42. Also, while the valve of FIGURE 1 is shown as having an adjustable upper ring, it will be apparent to those skilled in the art that this "ring" may be fixed to the disc or disc holder and that the disc and disc holder may be integral. Inasmuch as these as well as many other variations are possible while not departing from the invention, the foregoing should be taken solely as illustrations of and not as limiting the scope of the invention.

Accordingly, modifications of the invention may be resorted to without departing from the spirit hereof or the scope of the appended claims.

What is claimed is:
1. A spring loaded safety valve comprising a disc, a seat for the disc, means providing a back pressure chamber for the disc, a constant vent outlet for said back pressure chamber, means providing an inlet to said back pressure chamber, means including spindle overlap means providing a second vent outlet for said chamber in parallel flow relationship to said constant vent outlet and which varies in area between maximum lift and the seated position of the disc, said spindle overlap means including means for varying the ratio of the area of said inlet to the area of said second vent outlet as measured when said disc is at maximum lift.

2. A safety valve as described in claim 1 having means for varying the flow area provided by said constant vent outlet.

3. A safety valve as described in claim 1 in which said constant vent outlet comprises a removable plug having a bleed orifice of predetermined size.

4. A spring loaded safety valve comprising a disc, a seat for the disc, means providing a constantly vented back pressure chamber for the disc, means providing an inlet to said back pressure chamber, means including spindle overlap means providing an outlet for said chamber which varies in area between maximum lift and seated position of the disc, said spindle overlap means comprising means for varying the ratio of the area of said inlet to the area of said outlet as measured when said disc is at maximum lift and including a spindle movable with said disc, means providing an opening into said chamber through which said spindle extends, a pair of telescopically arranged generally cylindrical members disposed coaxially over said spindle and received in said opening, the outer member closely fitting within said opening, the inner member having a portion extending longitudinally beyond said outer member having an outer diameter substantially less than that of said outer member and progressively decreasing in a direction along the spindle corresponding to movement of the disc toward said seat, and means mounting said inner member on said spindle for movement axially relative thereto.

5. A spring loaded safety valve as described in claim 4 further comprising means mounting said outer member on said inner member for selective movement of said outer member longitudinally of and relative to said inner member and spindle.

References Cited
UNITED STATES PATENTS

| | | | |
|---|---|---|---|
| 1,949,150 | 2/1934 | Eplett | 137—470 |
| 1,972,435 | 9/1934 | Ackermann | 137—470 |
| 2,754,842 | 7/1956 | Hagiwara | 137—470 |
| 2,880,751 | 4/1959 | Tobis | 137—478 |

WILLIAM F. O'DEA, *Primary Examiner.*

H. W. WEAKLEY, *Assistant Examiner.*